United States Patent
Zhang et al.

(10) Patent No.: US 12,320,693 B2
(45) Date of Patent: Jun. 3, 2025

(54) METHOD AND SYSTEM FOR DETECTING DIRT ON ELECTRODE OF ELECTROMAGNETIC FLOWMETER

(71) Applicant: CHONGQING UNIVERSITY, Chongqing (CN)

(72) Inventors: Ke Zhang, Chongqing (CN); Yi Chai, Chongqing (CN); Yalin Qian, Chongqing (CN); Huaxiang Pu, Chongqing (CN); Jialu Wang, Chongqing (CN); Qianqian Song, Chongqing (CN); Keyue Qiu, Chongqing (CN); Xichen Li, Chongqing (CN); Yiyao An, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 540 days.

(21) Appl. No.: 17/857,563

(22) Filed: Jul. 5, 2022

(65) Prior Publication Data
US 2023/0366721 A1 Nov. 16, 2023

(30) Foreign Application Priority Data
May 11, 2022 (CN) .......................... 202210510275.4

(51) Int. Cl.
G01F 25/10 (2022.01)
G01F 1/60 (2006.01)

(52) U.S. Cl.
CPC ................ *G01F 25/10* (2022.01); *G01F 1/60* (2013.01)

(58) Field of Classification Search
None
See application file for complete search history.

(56) References Cited

U.S. PATENT DOCUMENTS

| | | | |
|---|---|---|---|
| 3,664,191 A * | 5/1972 | Hermanns | G01F 1/584 310/11 |
| 2012/0071780 A1* | 3/2012 | Barachant | G06F 18/2132 700/12 |
| 2016/0306907 A1* | 10/2016 | Lu | G06F 30/23 |
| 2017/0115146 A1* | 4/2017 | Shi | G01F 25/10 |
| 2020/0018627 A1* | 1/2020 | Arai | G01F 1/60 |

* cited by examiner

*Primary Examiner* — Farhana A Hoque
*Assistant Examiner* — Joseph O Nyamogo
(74) *Attorney, Agent, or Firm* — James P. Muraff; McDonald Hopkins LLC

(57) ABSTRACT

A method and system for detecting dirt on an electrode of an electromagnetic flowmeter are provided. The method includes: under three different conditions acquiring resistance values between the electrode and ground to form a first dataset, second datasets, and a sample set to be tested; extracting a positive definite feature matrix corresponding to each sample batch and calculating a Riemann center thereof; calculating a similarity index between the sample feature matrix and each of the first feature matrices and second feature matrices; extracting/feature matrices with a largest similarity index, and calculating a local Riemann center thereof; and calculating proximity between the local Riemann center and each of the second Riemann centers, and determining that a Riemann center with the greatest proximity corresponds to dirt on the electrode corresponding to the sample set to be tested. The method can achieve online rapid detection of dirt on the electrode.

10 Claims, 3 Drawing Sheets

METHOD AND SYSTEM FOR DETECTING DIRT ON ELECTRODE OF ELECTROMAGNETIC FLOWMETER

This patent application claims the benefit and priority of Chinese Patent Application No. 202210510275.4, entitled "METHOD AND SYSTEM FOR DETECTING DIRT ON ELECTRODE OF ELECTROMAGNETIC FLOWMETER" filed on May 11, 2022, the disclosure of which is incorporated by reference herein in its entirety as part of the present application.

TECHNICAL FIELD

The present disclosure relates to the technical field of fault diagnosis for electromagnetic flowmeters, and in particular to a method and system for detecting dirt on an electrode of an electromagnetic flowmeter.

BACKGROUND ART

If a medium to be measured is relatively dirty for a long term, dirt will be generated on an electrode of an electromagnetic flowmeter after the electromagnetic flowmeter has been working on the medium for a period of time. When the electrical conductivity of the dirt substance is different from that of the measured medium, measurement errors will occur. Moreover, sludge and oil may be attached to the electrode, which will also cause an output of the meter swing and drift. However, to date, there is still no method for efficiently detecting the attachment on the electrode, and such attachment can only be manually detected when the electromagnetic flowmeter is offline, making it impossible to timely recognize any problems during the working period of the electromagnetic flowmeter.

SUMMARY

An objective of the present disclosure is to provide a method and system detecting for dirt on an electrode of an electromagnetic flowmeter, so as to achieve online rapid detection of dirt on the electrode of the electromagnetic flowmeter.

In order to achieve the above objective, the present disclosure provides the following technical solutions.

A method for detecting dirt on the electrode of the electromagnetic flowmeter includes:

under a condition that the electromagnetic flowmeter is offline and there is no dirt on the electrode, acquiring resistance values between the electrode and the ground to form a first dataset;

extracting a first feature matrix corresponding to each sample batch in the first dataset;

calculating a first Riemann center of all first feature matrices corresponding to all sample batches in the first dataset;

under a condition that the electromagnetic flowmeter is offline and there are different types of dirt attached to the electrode, acquiring resistance values between the electrode and the ground to form second datasets;

extracting a second feature matrix corresponding to each sample batch in the second datasets corresponding to different types of dirt;

calculating a second Riemann center of all second feature matrices corresponding to all sample batches in each of the second datasets;

under a condition that the electromagnetic flowmeter works online, acquiring resistance values between the electrode and the ground to form a sample set to be tested, and extracting a sample feature matrix of the sample set to be tested;

respectively calculating a similarity index between the sample feature matrix and each of the first feature matrices and the second feature matrices;

extracting a preset number of feature matrices with a largest similarity index, and calculating a local Riemann center of the preset number of feature matrices;

calculating proximity between the local Riemann center and the first Riemann center and proximity between the local Riemann center and the second Riemann center; and determining a dirt detection result of the electrode corresponding to the sample set to be tested according to a dataset corresponding to a Riemann center with greatest proximity.

Optionally, extracting the first feature matrix corresponding to each sample batch in the first dataset specifically includes:

extracting a first feature matrix corresponding to each sample batch in the first dataset according to $$P_i = \frac{1}{n}\Omega_i \Omega_i^T;$$

where $\Omega_i$ denotes an i th sample batch in the first dataset, $\Omega_i = [\sigma_i(1), \sigma_i(2), \ldots, \sigma_i(n)] \in R^{m \times n}$, and $\sigma_i(n)$ denotes nth resistance value data in $\Omega_i$; n denotes a data sampling size of each sample batch, m denotes a dimensionality of resistance value data, and $R^{m \times n}$ denotes a vector space of m×n; and $P_i$ denotes a first feature matrix corresponding to the i th sample batch $\Omega_i$ in the first dataset.

Optionally, calculating the first Riemann center of all first feature matrices corresponding to all sample batches in the first dataset specifically includes:

calculating the first Riemann center $P_g$ of all first feature matrices corresponding to all sample batches in the first dataset according to $$P_g = \arg\min \sum_{j=1, j \neq i}^{N} \sum_{i=1}^{N} d_R^2(P_i, P_j);$$

where $P_j$ denotes a first feature matrix corresponding to a j th sample batch $\Omega_j$ in the first dataset; $d_R(P_i, P_j)$ denotes a Riemann distance between $P_i$ and $P_j$; and N denotes the number of sample batches in the first dataset.

Optionally, respectively calculating the similarity index between the sample feature matrix and each of the first feature matrices and the second feature matrices specifically includes:

respectively calculating a similarity index $S_{oz}$ between the sample feature matrix $Q_c$ and each of the first feature matrices and the second feature matrices according to $$S_{oz} = \sqrt{\sum_{a=1}^{m} \ln^2 \lambda_a(Q_c, P_z)^{-1}};$$

where $P_z$ denotes a zth feature matrix in a set of the first feature matrices and the second feature matrices; and $\lambda_a(Q_c, P_z)$ denotes a feature value of $Q_c^{-1}P_z$.

Optionally, calculating the proximity between the local Riemann center and the first Riemann center and the proximity between the local Riemann center and the second Riemann center specifically includes:

respectively calculating the proximity $\alpha$ between the local Riemann center $P_{g0}$ and the first Riemann center $P_g$ and the proximity $\alpha$ between the local Riemann center $P_{g0}$ and the second Riemann center $P_{gc}$ according to $$\alpha = \frac{P_{g0}}{P_g} \text{ and } \alpha = \frac{P_{g0}}{P_{gc}}.$$

A system for detecting dirt on the electrode of the electromagnetic flowmeter includes:

a first dataset acquisition module configured to, under a condition that the electromagnetic flowmeter is offline and there is no dirt on the electrode, acquire resistance values between the electrode and the ground to form a first dataset;

a first feature matrix extraction module configured to extract a first feature matrix corresponding to each sample batch in the first dataset;

a first Riemann center calculation module configured to calculate a first Riemann center of all first feature matrices corresponding to all sample batches in the first dataset;

a second dataset acquisition module configured to, under a condition that the electromagnetic flowmeter is offline and there are different types of dirt attached to the electrode, acquire resistance values between the electrode and the ground to form second datasets;

a second feature matrix extraction module configured to extract the second feature matrix corresponding to each sample batch in the second datasets corresponding to different types of dirt;

a second Riemann center calculation module configured to calculate a second Riemann center of all second feature matrices corresponding to all sample batches in each of the second datasets;

a sample feature matrix extraction module configured to, under a condition that the electromagnetic flowmeter works online, acquire resistance values between the electrode and the ground to form a sample set to be tested, and extract a sample feature matrix of the sample set to be tested;

a similarity index calculation module configured to respectively calculate the similarity index between the sample feature matrix and each of the first feature matrices and the second feature matrices;

a local Riemann center calculation module configured to extract the preset number of feature matrices with a largest similarity index, and calculate a local Riemann center of the preset number of feature matrices;

a proximity calculation module configured to calculate proximity between the local Riemann center and the first Riemann center and proximity between the local Riemann center and the second Riemann center; and a dirt detection result determination module configured to determine a dirt detection result of the electrode corresponding to the sample set to be tested according to a dataset corresponding to a Riemann center with greatest proximity.

Optionally, the first feature matrix extraction module specifically includes:

a first feature matrix extraction unit configured to extract the first feature matrix corresponding to each sample batch in the first dataset according to $$P_i = \frac{1}{n}\Omega_i \Omega_i^T;$$

where $\Omega_i$ denotes an i th sample batch in the first dataset, $\Omega_i=[\sigma_i(1),\sigma_i(2), \ldots, \sigma_i(n)] \in R^{m \times n}$, and $\sigma_i(n)$ denotes nth resistance value data in $\Omega_1$; n denotes a data sampling size of each sample batch, m denotes a dimensionality of resistance value data, and $R^{m \times n}$ denotes a vector space of m×n; and $P_i$ denotes a first feature matrix corresponding to the i th sample batch $\Omega_1$ in the first dataset.

Optionally, the first Riemann center calculation module specifically includes:

a first Riemann center calculation unit configured to calculate the first Riemann center $P_g$ of all first feature matrices corresponding to all sample batches in the first dataset according to $$P_g = \arg\min \sum_{j=1, j \neq i}^{N} \sum_{i=1}^{N} d_R^2(P_i, P_j);$$

where $P_j$ denotes a first feature matrix corresponding to a j th sample batch $\Omega_j$ in the first dataset; $d_R(P_i, P_j)$ denotes a Riemann distance between $P_i$ and $P_j$; and N denotes the number of sample batches in the first dataset.

Optionally, the similarity index calculation module specifically includes:

a similarity index calculation unit configured to respectively calculate the similarity index $S_{oz}$ between the sample feature matrix $Q_c$ and each of the first feature matrices and the second feature matrices according to $$S_{oz} = \sqrt{\sum_{a=1}^{m} \ln^2 \lambda_a(Q_c, P_z)^{-1}};$$

where $P_z$ denotes a zth feature matrix in a set of the first feature matrices and the second feature matrices; and $\lambda_a(Q_c, P_z)$ denotes a feature value of $Q_c^{-1}P_z$.

Optionally, the proximity calculation module specifically includes:

a proximity calculation unit configured to respectively calculate proximity $\alpha$ between the local Riemann center $P_{g0}$ and the first Riemann center $P_g$ and proximity $\alpha$ between the local Riemann center $P_{g0}$ and the second Riemann center $P_{gc}$ according to $$\alpha = \frac{P_{g0}}{P_g} \text{ and } \alpha = \frac{P_{g0}}{P_{gc}}.$$

According to the specific embodiments provided by the present disclosure, the present disclosure discloses the following technical effects:

The present disclosure provides a method and system for detecting dirt on an electrode of an electromagnetic flowmeter. The method includes: under the condition that the electromagnetic flowmeter is offline and there is no dirt on the electrode, acquiring resistance values between the electrode and the ground to form a first dataset; extracting a first feature matrix corresponding to each sample batch in the first dataset; calculating a first Riemann center of all first feature matrices corresponding to all sample batches in the first dataset; under the condition that the electromagnetic flowmeter is offline and there are different types of dirt attached to the electrode, acquiring the resistance values between the electrode and the ground to form a second datasets; extracting a second feature matrix corresponding to each sample batch in the second datasets corresponding to different types of dirt; calculating the second Riemann center of all second feature matrices corresponding to all sample batches in each of the second datasets; under the condition that the electromagnetic flowmeter works online, acquiring the resistance values between the electrode and the ground to form a sample to be tested, and extracting the sample feature matrix of the sample set to be tested; respectively calculating a similarity index between the sample feature matrix and each of the first feature matrices and the second feature matrices; extracting a preset number of feature matrices with the largest similarity index, and calculating a local Riemann center of the preset number of feature matrices; calculating proximity between the local Riemann center and the first Riemann center and proximity between the local Riemann center and the second Riemann center; and determining a dirt detection result of the electrode corresponding to the sample set to be tested according to the dataset corresponding to the Riemann center with the greatest proximity. The method can achieve an online rapid detection of dirt on the electrode of the electromagnetic flowmeter.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative effort.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other examples obtained by a person of ordinary skill in the art based on the examples of the present disclosure without creative efforts shall fall within the protection scope of the present disclosure.

An objective of the present disclosure is to provide a method and system for detecting dirt on an electrode of an electromagnetic flowmeter, so as to achieve online rapid detection of dirt on the electrode of the electromagnetic flowmeter.

To make the above-mentioned objective, features, and advantages of the present disclosure clearer and more comprehensible, the present disclosure will be further described in detail below in conjunction with the accompanying drawings and specific embodiments.

Figure 1:
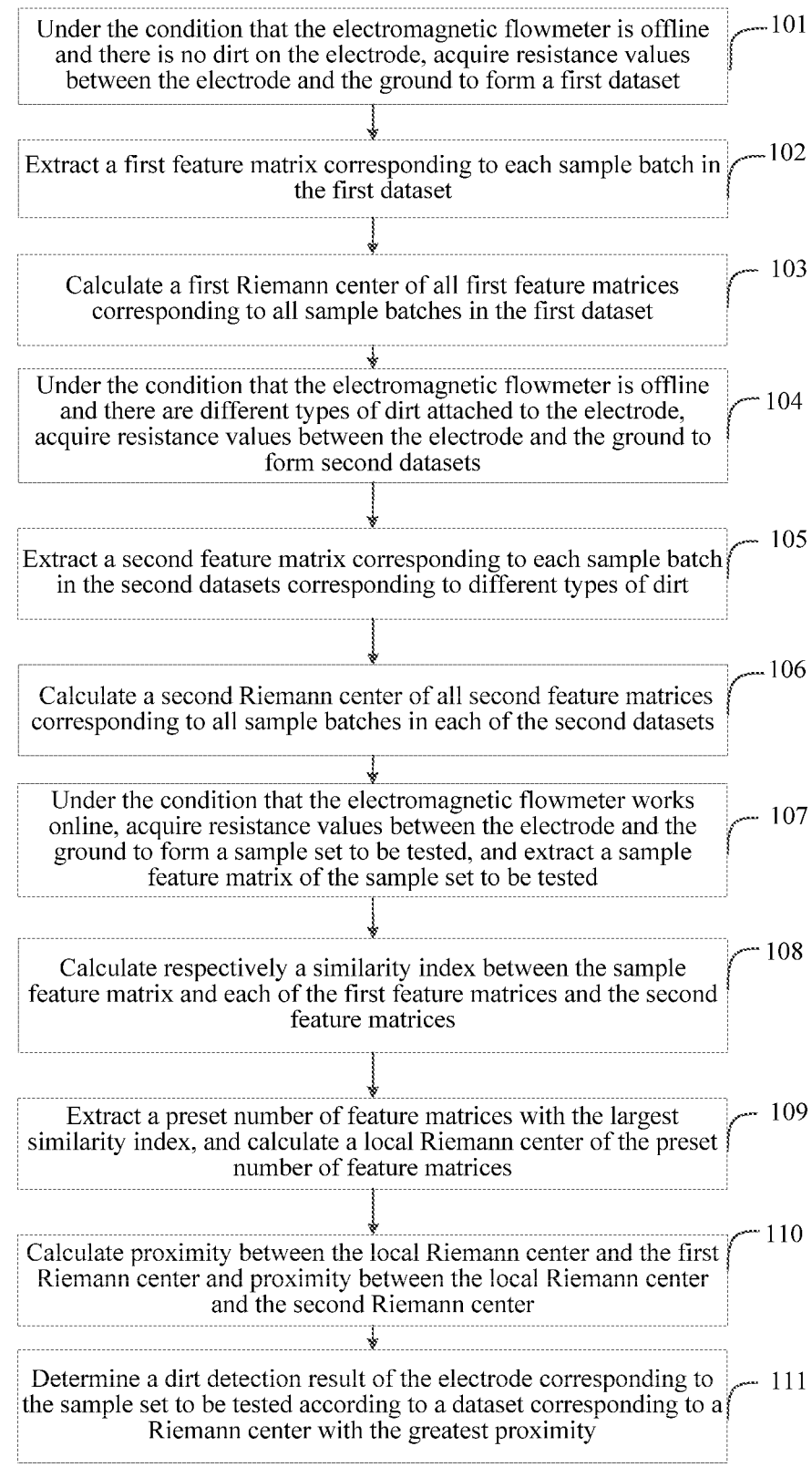
FIG. 1 shows a flowchart of a method for detecting dirt on an electrode of an electromagnetic flowmeter according to the present disclosure.
Figure 2:
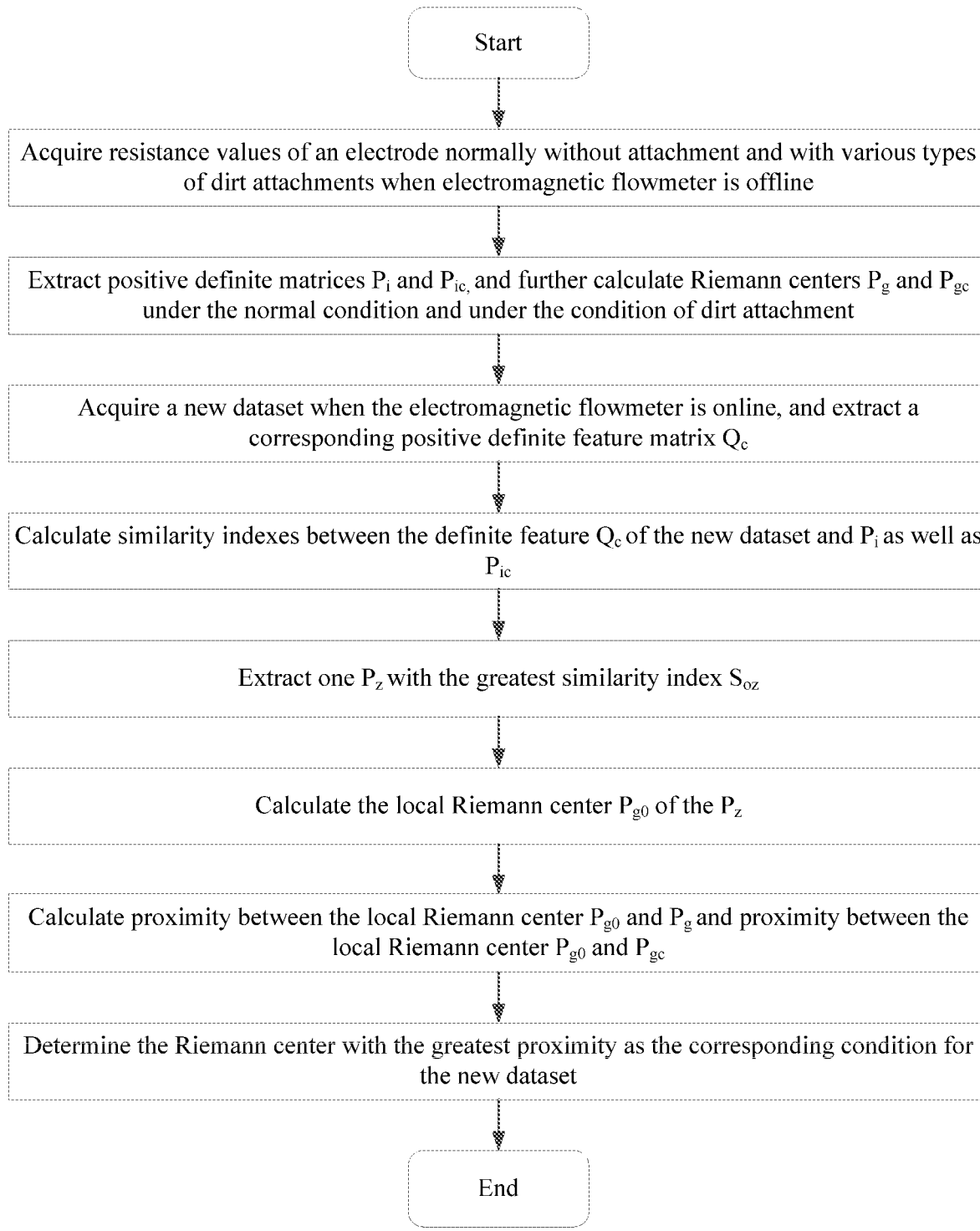
FIG. 2 shows a schematic diagram illustrating a principle of a method for detecting dirt on an electrode of an electromagnetic flowmeter according to the present disclosure.

FIG. 1 shows a flowchart of a method for detecting dirt on an electrode of an electromagnetic flowmeter according to the present disclosure, and FIG. 2 shows a schematic diagram illustrating a principle of the method for detecting dirt on the electrode of the electromagnetic flowmeter according to the present disclosure. With reference to FIGS. 1 and 2, the method for detecting dirt on the electrode of the electromagnetic flowmeter includes steps 101-111.

Step 101: under a condition that the electromagnetic flowmeter is offline and there is no dirt on the electrode, resistance values between the electrode and ground are acquired to form a first dataset.

The method of the present disclosure includes detecting the resistance values of the electrode to the ground under three different conditions, and determining whether a fault occurs to the meter itself according to changes of the resistance values. Condition 1: the electromagnetic flowmeter is offline and there is no dirt on the electrode. Condition 2: the electromagnetic flowmeter is offline and different types of dirt are attached to the electrode. Condition 3: the electromagnetic flowmeter works online. Under each of the three different conditions above, the resistance values between the electrode and the ground are respectively acquired to form the first dataset, the second datasets and a sample set to be tested.

Specifically, under the condition that the electromagnetic flowmeter is offline and there is no dirt on the electrode, the resistance values between the electrode and the ground to form the first dataset $\Omega_g=\{\Omega_1,\Omega_2,\ldots,\Omega_N\}$; where the first dataset $\Omega_g$ includes N simple batches $\Omega_1,\Omega_2,\ldots,\Omega_N$. $\Omega_i[\sigma_i(1),\sigma_i(2),\ldots,\sigma_i(n)] \in R^{m \times n}$ denotes an i th sample batch in the first dataset $\Omega_g$; the subscript i denotes an ith batch of process data put on record, i=1, 2, ..., N. n denotes a sampling size of a single sample batch, and m denotes a dimensionality of a measurement vector. $\sigma_i(n)$ denotes nth sampling resistance value data in $Q_i$.

Step 102: a first feature matrix corresponding to each sample batch in the first dataset is extracted.

A positive definite feature matrix extracted from each sample batch $\Omega_i$ in the first dataset is calculated as the first feature matrix $P_i$:

$$P_i = \frac{1}{n}\Omega_i\Omega_i^T \qquad (1)$$

where i=1, 2, ..., N, and N denotes the number of samples as recorded, which is typically big enough to cover all circumstances that possibly occur under a normal condition.

The obtained positive definite feature matrix $P_i$ is encapsulated in a first database, which is named as a database under a normal condition.

Therefore, Step 102 of extracting the first feature matrix corresponding to each sample batch in the first dataset specifically includes:

extracting the first feature matrix corresponding to each sample batch in the first dataset using the formula $$P_i = \frac{1}{n}\Omega_i\Omega_i^T;$$

where $\Omega_i$ denotes the i th sample batch in the first dataset $\Omega_g$, and $\Omega_i[\sigma_i(1),\sigma_i(2), \ldots, \sigma_i(n)] \in R^{m \times n}$, where $\sigma_i(n)$ denotes nth resistance value data in $\Omega_i$; n denotes the data sampling size of each sample batch, m denotes the dimensionality of resistance value data, and $R^{m \times n}$ denotes a vector space of m×n; and $P_i$ denotes a first feature matrix corresponding to the i th sample batch $\Omega_i$ in the first dataset $\Omega_g$.

Step 103: A first Riemann center of all first feature matrices corresponding to all sample batches in the first dataset, is calculated.

All first feature matrices $P_i$ corresponding to all $\Omega_i$ in the first dataset $\Omega_g$ are extracted and encapsulated in the first database, and the first Riemann center $P_g$ corresponding to the first feature matrices is calculated:

$$P_g = \arg\min \sum_{j=1, j \neq i}^{N} \sum_{i=1}^{N} d_R^2(P_i, P_j) \quad (2)$$

$P_g$ denotes a Riemann center of all positive definite feature matrices $P_i$ in the database under the normal condition, where the Riemann center indicates a point on a Riemann manifold that minimizes a sum of squares of Riemann distances from the point to given positive definite matrices. arg min denotes a value of variable where the formula attains a minimum. $d_R(P_i, P_j)$ denotes a Riemann distance, which can be calculated by the following formula:

$$d_R(P_i, P_j) = \|\log P_i^{-1/2} P_j P_i^{-1/2}\|_F = \sqrt{\sum_{a=1}^{m} \log^2 \lambda_a(P_i, P_j)} \quad (3)$$

where $\text{Log}(\cdot)$ denotes a logarithm of a matrix; $\lambda_a(P_i, P_j)$, a=1, m denotes a feature value of $P_i^{-1}P_j$.

Therefore, Step 103 of calculating the first Riemann center of all first feature matrices corresponding to all sample batches in the first dataset specifically includes:

calculating the first Riemann center $P_g$ of all first feature matrices corresponding to all sample batches in the first dataset $\Omega_g$ according to $$P_g = \arg\min \sum_{j=1, j \neq i}^{N} \sum_{i=1}^{N} d_R^2(P_i, P_j);$$

where $P_j$ denotes a first feature matrix corresponding to a j th sample batch $\Omega_j$ in the first dataset; $d_R(P_i, P_j)$ denotes a Riemann distance between $P_i$ and $P_j$; and N denotes the number of the sample batches in the first dataset.

Step 104: under the condition that the electromagnetic flowmeter is offline and there are different types of dirt attached to the electrode, resistance values between the electrode and the ground to form second datasets.

Similar to Condition 1 as described in Step 101, under the condition that the electromagnetic flowmeter is offline and there are different types of dirt attached to the electrode, resistance values between the electrode and the ground are respectively measured to form second datasets. Specifically, under the condition that the electromagnetic flowmeter is offline and a cth type of dirt is attached to the electrode, resistance values between the electrode and the ground are acquired to form a cth second dataset $\Omega_{gc}\{\Omega_{1c},\Omega_{2c}, \ldots, \Omega_{Mc}\}$; where c=1, 2, ..., C, and C denotes the number of types of dirt. That is, a second dataset corresponding to each type of dirt is acquired. The second dataset corresponding to the cth type of dirt is marked as $\Omega_{gc}$. C second datasets are acquired in total. Furthermore, different kinds or types of dirt refer to scale, oxide film, organic oil and inorganic pollutants which are easily attached to the electrode of the electromagnetic flowmeter.

The second dataset $\Omega_{gc}$ corresponding to the cth type of dirt includes M sample batches $\Omega_{1c},\Omega_{2c}, \ldots, \Omega_{Mc}$. $\Omega_{ic}\{\sigma_{ic}(1),\sigma_{ic}(2), \ldots, \sigma_{ic}(n)\} \in R^{m \times n}$ denotes an ith sample batch in the second dataset $\Omega_{gc}$; the subscript i denotes an ith batch of process data put on record, i=1, 2, ..., M. n denotes a sampling size of a single sample batch, and m denotes a dimensionality of a measurement vector. $\sigma_{ic}(n)$ denotes an nth sampling resistance value data in $\Omega_{ic}$.

Step 105: a second feature matrix corresponding to each sample batch in each of the second datasets corresponding to different types of dirt is extracted.

Regarding each sample batch $\Omega_{ic}$ in the second dataset $\Omega_{gc}$ corresponding to the cth type of dirt, a corresponding positive definite feature matrix is extracted as a second feature matrix $P_{ic}$:

$$P_{ic} = \frac{1}{n}\Omega_{ic}\Omega_{ic}^T \quad (4)$$

where i=1, 2, ..., M, and M denotes the number of samples as recorded, which is typically big enough. c=1, 2, ..., C, which shall cover all possible types of dirt on the electrode.

All obtained second feature matrices $P_{ic}$ corresponding to each type of dirt are encapsulated in a second database, which is named as a database under a condition where dirt is attached. The second feature matrices $P_{ic}$ calculated based on the second datasets corresponding to different types of dirt, such as scale, oxide film, organic oil, inorganic pollutants and so on, are separately encapsulated to facilitate later monitoring of the type of dirt.

Step 106: a second Riemann center of all second feature matrices corresponding to all sample batches in each of the second datasets, is calculated.

All second feature matrices $P_{ic}$ corresponding to all sample batches $\Omega_{ic}$ in the second dataset $\Omega_{gc}$ are extracted and encapsulated in the second database, and a Riemann center $P_{gc}$ of datasets of various types of dirt is calculated:

$$P_{gc} = \arg\min \sum_{j=1, j \neq i}^{M} \sum_{i=1}^{M} d_R^2(P_{ic}, P_{jc}) \quad (5)$$

where $P_{gc}$ denotes a Riemann center of all second feature matrices corresponding to all sample batches in the second dataset $\Omega_{gc}$ corresponding to the cth type of dirt, and for the purpose of distinguishing the Riemann center from the foregoing first Riemann center $P_g$, $P_{gc}$ is denoted as the second Riemann center. $c=1, 2, \ldots, C$, and C denotes the number of types of dirt. $P_{ic}$ denotes a second feature matrix corresponding to an ith sample batch $\Omega_{ic}$ in the second dataset $\Omega_{gc}$; $P_{jc}$ denotes a second feature matrix corresponding to a j th sample batch $Q_{jc}$ in the second dataset $\Omega_{gc}$; $d_R(P_{ic}, P_{jc})$ denotes a Riemann distance between $P_{ic}$ and $P_{jc}$; and M denotes the number of sample batches in the second dataset $\Omega_{gc}$.

Step 107: under a condition that the electromagnetic flowmeter works online, resistance values between the electrode and the ground are acquired to form a sample set to be tested, and a sample feature matrix of the sample set to be tested is extracted.

Similar to the first two conditions described in Step 101 and Step 104, under the condition that the electromagnetic flowmeter works online, the resistance values between the electrode and the ground are acquired to form the sample set to be tested $\Omega = [\Omega(1), \ldots, \Omega(n)] \in R^{m \times n}$, where $\Omega(n)$ denotes nth sampling resistance value data in the sample set to be tested $\Omega$, and the sample set to be tested $\Omega$ refers to a batch dataset with m-dimensional measurement vectors obtained by sampling per unit time.

Under the condition that the electromagnetic flowmeter works online, a new dataset is acquired as a sample set to be tested $\Omega$, and the sample feature matrix $Q_c$ of the sample set to be tested $\Omega$ is extracted:

$$Q_c = \frac{1}{n}\Omega\Omega^T \qquad (6)$$

where n denotes a sampling size of this group of data, and $Q_c$ denotes the sample feature matrix of the sample set to be tested $\Omega$.

Step 108: a similarity index between the sample feature matrix and each of the first feature matrices and the second feature matrices is calculated respectively.

A similarity index $S_{oz}$, between the sample feature matrix $Q_c$ of the sample set to be tested $\Omega$ and each of the first feature matrices $P_i$ and the second feature matrices $P_{ic}$, is calculated, and the similarity index $S_{oz}$ being defined as:

$$S_{oz} = \sqrt{\sum_{a=1}^{m} \ln^2 \lambda_a(Q_c, P_z)^{-1}} \qquad (7)$$

where $P_z$ denotes a zth feature matrix in a set of $P_i$ and $P_{ic}$; and $z=1, 2, \ldots, N+M \times C$; $\lambda_a(Q_c, P_z)$, with $a=1, m$, denotes a feature value of $Q_c^{-1}P_z$, and m denotes the quantity of the feature values; and $S_{oz}$ denotes a similarity index between $Q_c$ and $P_z$.

Therefore, Step 108 of calculating the similarity index between the sample feature matrix and each of the first feature matrices and the second feature matrices specifically includes:

respectively calculating the similarity index Soz between the sample feature matrix $Q_0$ c and each of the first feature matrices, and the second feature matrices according to $$S_{oz} = \sqrt{\sum_{a=1}^{m} \ln^2 \lambda_a(Q_c, P_z)^{-1}};$$

where $P_z$ denotes the zth feature matrix in the set of the first feature matrices and the second feature matrices; and $\lambda_a(Q_c, P_z)$ denotes the feature value of $Q_c^{-1}P_z$.

Step 109: a preset number of feature matrices with the largest similarity index are extracted, and a local Riemann center of the preset number of feature matrices is calculated.

l feature matrices $P_z$ with the greatest similarity index S, between the sample feature matrix $Q_c$ and each of $P_i$ and $P_{ic}$ are extracted, and the local Riemann center $P_{g0}$ of the l $P_z$ with the greatest similarity index $S_{oz}$ is calculated:

$$P_{g0} = \arg\min \sum_{j=1, j \neq i}^{l} \sum_{i=1}^{l} d_R^2(P_{iz}, P_{jz}) \qquad (8)$$

where l denotes a preset number; $P_{iz}$ and $P_{jz}$ denote an ith feature matrix and a j th feature matrix in the preset number of feature matrices, respectively; and $d_R(P_{iz}, P_{jz})$ denotes a Riemann distance between $P_{iz}$ and $P_{jz}$.

Step 110: proximity between the local Riemann center and the first Riemann center and proximity between the local Riemann center and the second Riemann center are calculated.

The proximity between the local Riemann center $P_{g0}$ and $P_g$ and the proximity between the local Riemann center and $P_{gc}$ are calculated, and the proximity is determined using a percentage $\alpha$:

$$\alpha = \frac{P_{g0}}{P_g} \qquad (9)$$

or $$\alpha = \frac{P_{g0}}{P_{gc}} \qquad (10)$$

The proximity with the maximum a corresponds to the sample set to be tested.

Therefore, Step 110 of calculating the proximity between the local Riemann center and the first Riemann center and the proximity between the local Riemann center and the second Riemann center specifically includes:

calculating the proximity $\alpha$ between the local Riemann center $P_{g0}$ and the first Riemann center $P_g$ and the proximity $\alpha$ between the local Riemann center $P_{g0}$ and the second Riemann center $P_{gc}$ according to $$\alpha = \frac{P_{g0}}{P_g} \text{ and } \alpha = \frac{P_{g0}}{P_{gc}}.$$

Step 111: a dirt detection result of the electrode corresponding to the sample set to be tested is determined according to a dataset corresponding to a Riemann center with the greatest proximity.

The dirt detection result of the electrode corresponding to the sample set to be tested $\Omega$ is determined according to the dataset corresponding to the Riemann center with the greatest proximity $\alpha$. For example, if the Riemann center with the greatest proximity $\alpha$ is $P_g$, it is determined that the dirt detection result of the electrode corresponding to the sample set to be tested $\Omega$ indicates that there is no dirt on the electrode. If the Riemann center with the greatest proximity $\alpha$ is $P_{gc}$, it is determined that there is dirt attached to the electrode, and the cth type of dirt attached to the electrode corresponding to the sample set to be tested Ω may be determined according to the dataset $Ω_{gc}$ corresponding to $P_{gc}$. For example, if the Riemann center with the greatest proximity α is $P_{g1}$, a first type of dirt corresponding to the second dataset $Ω_{g1}$ corresponding to $P_{g1}$ is exactly the dirt detection result of the electrode corresponding to the sample set to be tested Ω. Different detergents are adopted for removing different types of dirt, such that dirt can be removed more efficiently.

The present disclosure provides the method for detecting dirt on the electrode of the electromagnetic flowmeter, including: under the condition that the electromagnetic flowmeter is offline and there is no dirt on the electrode, acquiring the resistance values between the electrode and the ground to form the first dataset $Ω_g=\{Ω_1,Ω_2,\ldots,Ω_N\}$, extracting positive definite feature matrices $P_i$ corresponding to $Ω_i$ to be encapsulated in the first database, and calculating a Riemann center $P_g$ of the positive definite feature matrices; under the condition that the electromagnetic flowmeter is offline and the cth type of dirt is attached to the electrode, measuring the resistance values between the electrode and the ground to form the second dataset $Ω_{gc}=\{Ω_{1c}, Ω_{2c},\ldots,Ω_{Mc}\}$, extracting positive definite feature matrices $P_{ic}$ corresponding to $Ω_{ic}$ to be encapsulated in the second database, and meanwhile calculating the Riemann center $P_{gc}$ of the positive definite feature matrices; under the condition that the electromagnetic flowmeter works online, acquiring the new dataset $Ω=[Ω(1),\ldots,Ω(n)]\in R^{m\times n}$ as the sample set to be tested, and extracting the feature matrix $Q_c$ of the sample set to be tested Ω; calculating the similarity index $S_{oz}$ between the sample feature matrix $Q_c$ of the new dataset and each of $P_i$ and $P_{ic}$; extracting l $P_z$ with the greatest similarity index $S_{oz}$ against $Q_c$; calculating a local Riemann center $P_{g0}$ of the l $P_z$; and calculating the proximity between the local Riemann center $P_{g0}$ and $P_g$ and the proximity between the local Riemann center $P_{g0}$ and $P_{gc}$, and determining that the Riemann center with the greatest proximity indicates the corresponding condition for the electrode of the sample set to be tested. The method of the present disclosure can not only quickly determine whether there is dirt attached to the electrode or not, but also accurately analyze what type of dirt is attached to the electrode, both of which can be distinguished by different resistance values, thereby effectively improving the efficiency of detecting dirt on the electrode and the accuracy of detection results for the electromagnetic flowmeter.

Figure 3:
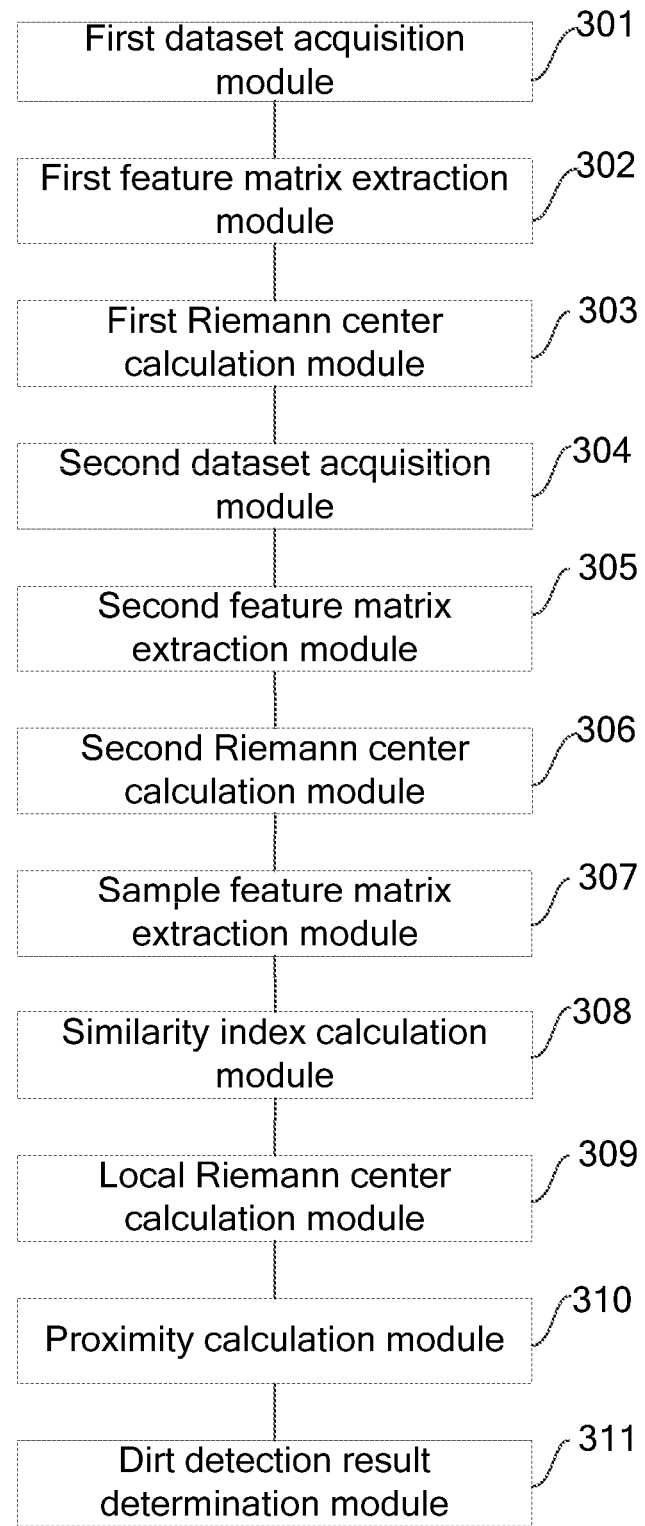
FIG. 3 shows a structural schematic diagram of a detection system for dirt on an electrode of an electromagnetic flowmeter according to the present disclosure.

Based on the method provided in the present disclosure, a system for detecting dirt on the electrode of the electromagnetic flowmeter is provided. Referring to FIG. 3, the system includes:

a first dataset acquisition module 301 configured to, under the condition that the electromagnetic flowmeter is offline and there is no dirt on the electrode, acquire resistance values between the electrode and the ground to form a first dataset;

a first feature matrix extraction module 302 configured to extract a first feature matrix corresponding to each sample batch in the first dataset;

a first Riemann center calculation module 303 configured to calculate a first Riemann center of all first feature matrices corresponding to all sample batches in the first dataset;

a second dataset acquisition module 304 configured to, under the condition that the electromagnetic flowmeter is offline and there are different types of dirt attached to the electrode, acquire resistance values between the electrode and the ground to form second datasets;

a second feature matrix extraction module 305 configured to extract the second feature matrix corresponding to each sample batch in the second datasets corresponding to different types of dirt;

a second Riemann center calculation module 306 configured to calculate second Riemann centers of all second feature matrices corresponding to all sample batches in the second datasets;

a sample feature matrix extraction module 307 configured to, under the condition that the electromagnetic flowmeter works online, acquire resistance values between the electrode and the ground to form a sample set to be tested, and extract a sample feature matrix of the sample set to be tested;

a similarity index calculation module 308 configured to calculate the similarity index between the sample feature matrix and each of the first feature matrices and the second feature matrices;

a local Riemann center calculation module 309 configured to extract a preset number of feature matrices with the largest similarity index, and calculate a local Riemann center of the preset number of feature matrices;

a proximity calculation module 310 configured to calculate proximity between the local Riemann center and the first Riemann center and proximity between the local Riemann center and each of the second Riemann centers; and a dirt detection result determination module 311 configured to determine the dirt detection result of the electrode corresponding to the sample set to be tested according the dataset corresponding to the Riemann center with the greatest proximity.

The first feature matrix extraction module 302 specifically includes:

a first feature matrix extraction unit configured to extract the first feature matrix corresponding to each sample batch in the first dataset according to $$P_i = \frac{1}{n}Ω_iΩ_i^T;$$

where $Ω_i$ denotes the i th sample batch in the first dataset, $Ω_i=[σ_i(1),σ_i(2),\ldots,σ_i(n)]\in R^{m\times n}$, and $σ_i(n)$ denotes nth resistance value data in $Ω_i$; n denotes a data sampling size of each sample batch, m denotes dimensionality of resistance value data, and $R^{m\times n}$ denotes a vector space of m×n; and $P_i$ denotes a first feature matrix corresponding to the i th sample batch $Ω_i$ in the first dataset.

The first Riemann center calculation module 303 specifically includes:

a first Riemann center calculation unit configured to calculate the first Riemann center $P_g$ of all first feature matrices corresponding to all samples batches in the first dataset according to $$P_g = \arg\min \sum_{j=1,j\neq i}^{N}\sum_{i=1}^{N} d_R^2(P_i, P_j);$$

where $P_j$ denotes a first feature matrix corresponding to the j th sample batch $Ω_j$ in the first dataset; $d_R(P_i,P_j)$ denotes a Riemann distance between $P_i$ and $P_j$; and N denotes the number of sample batches in the first dataset.

The similarity index calculation module 308 specifically includes:
a similarity index calculation unit configured to respectively calculate the similarity index $S_{oz}$ between the sample feature matrix $Q_{,c}$ and each of the first feature matrices and the second feature matrices according to $$S_{oz} = \sqrt{\sum_{a=1}^{m} \ln^2 \lambda_a(Q_c, P_z)^{-1}};$$

where $P_z$ denotes the zth feature matrix in a set of the first feature matrices and the second feature matrices; and $\lambda_a(Q_c, P_z)$ denotes a feature value of $Q_c^{-1}P_z$.

The proximity calculation module 310 specifically includes:
a proximity calculation unit configured to calculate the proximity $\alpha$ between the local Riemann center $P_{g0}$ and the first Riemann center $P_g$ and the proximity $\alpha$ between the local Riemann center and the second Riemann center $P_{gc}$ according to $$\alpha = \frac{P_{g0}}{P_g} \text{ and } \alpha = \frac{P_{g0}}{P_{gc}}.$$

Since the system disclosed in an embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and core ideas thereof; besides, various modifications may be made by a person of ordinary skill in the art to specific embodiments and the scope of application in accordance with the ideas of the present disclosure. In conclusion, the content of the present description shall not be construed as limitations to the present disclosure.

What is claimed is:

1. A method for detecting dirt on an electrode of an electromagnetic flowmeter, comprising:
under a condition that the electromagnetic flowmeter is offline and there is no dirt on the electrode, acquiring resistance values between the electrode and the ground to form a first dataset;
extracting a first feature matrix corresponding to each sample batch in the first dataset;
calculating a first Riemann center of all first feature matrices corresponding to all sample batches in the first dataset;
under a condition that the electromagnetic flowmeter is offline and there are different types of dirt attached to the electrode, acquiring resistance values between the electrode and the ground to form second datasets;
extracting a second feature matrix corresponding to each sample batch in the second datasets corresponding to different types of dirt;
calculating a second Riemann center of all second feature matrices corresponding to all sample batches in each of the second datasets;
under a condition that the electromagnetic flowmeter works online, acquiring resistance values between the electrode and the ground to form a sample set to be tested, and extracting a sample feature matrix of the sample set to be tested;
respectively calculating a similarity index between the sample feature matrix and each of the first feature matrices and the second feature matrices;
extracting a preset number of feature matrices with a largest similarity index, and calculating a local Riemann center of the preset number of feature matrices;
calculating proximity between the local Riemann center and the first Riemann center and proximity between the local Riemann center and the second Riemann center; and
determining a dirt detection result of the electrode corresponding to the sample set to be tested according to a dataset corresponding to a Riemann center with greatest proximity.

2. The method according to claim 1, wherein extracting the first feature matrix corresponding to each sample batch in the first dataset comprises:
extracting the first feature matrix corresponding to each sample batch in the first dataset according to $$P_i = \frac{1}{n}\Omega_i\Omega_i^T;$$

wherein $\Omega_i$ denotes an i th sample batch in the first dataset, $\Omega_i = [\sigma_i(1), \sigma_i(2), \ldots, \sigma_i(n)] \in R^{m \times n}$, and $\sigma_i(n)$ denotes nth resistance value data in $\Omega_i$; n denotes a data sampling size of each sample batch, m denotes a dimensionality of resistance value data, and $R^{m \times n}$ denotes a vector space of m×n; and $P_i$ denotes a first feature matrix corresponding to the i th sample batch $\Omega_1$ in the first dataset.

3. The method according to claim 2, wherein calculating the first Riemann center of all first feature matrices corresponding to all sample batches in the first dataset comprises:
calculating the first Riemann center P of all first feature matrices corresponding to all sample batches in the first dataset according to $$P_g = \arg\min \sum_{j=1, j \neq i}^{N} \sum_{i=1}^{N} d_R^2(P_i, P_j);$$

wherein $P_j$ denotes a first feature matrix corresponding to a j th sample batch $\Omega_j$ in the first dataset; $d_R(P_i, P_j)$ denotes a Riemann distance between $P_i$ and $P_j$; and N denotes a number of sample batches in the first dataset.

4. The method according to claim 3, wherein calculating the similarity index between the sample feature matrix and each of the first feature matrices and the second feature matrices comprises:
respectively calculating the similarity index $S_{oz}$ between the sample feature matrix $Q_c$ and each of the first feature matrices and the second feature matrices according to $$S_{oz} = \sqrt{\sum_{a=1}^{m} \ln^2 \lambda_a(Q_c, P_z)^{-1}};$$

wherein $P_z$ denotes a zth feature matrix in a set of the first feature matrices and the second feature matrices, and $\lambda_a(Q_c, P_z)$ denotes a feature value of $Q_c^{-1}P_z$.

5. The method according to claim 4, wherein calculating the proximity between the local Riemann center and the first Riemann center and the proximity between the local Riemann center and the second Riemann center comprises:

respectively calculating the proximity α between the local Riemann center $P_{g0}$ and the first Riemann center $P_g$ and the proximity α between the local Riemann center $P_{g0}$ and the second Riemann center $P_{gc}$ according to $$\alpha = \frac{P_{g0}}{P_g} \text{ and } \alpha = \frac{P_{g0}}{P_{gc}}.$$

6. A system for detecting dirt on an electrode of an electromagnetic flowmeter, comprising:

a first dataset acquisition module configured to, under a condition that the electromagnetic flowmeter is offline and there is no dirt on the electrode, acquire resistance values between the electrode and the ground to form a first dataset;

a first feature matrix extraction module configured to extract a first feature matrix corresponding to each sample batch in the first dataset;

a first Riemann center calculation module configured to calculate a first Riemann center of all first feature matrices corresponding to all sample batches in the first dataset;

a second dataset acquisition module configured to, under a condition that the electromagnetic flowmeter is offline and there are different types of dirt attached to the electrode, acquire resistance values between the electrode and the ground to form second datasets;

a second feature matrix extraction module configured to extract a second feature matrix corresponding to each sample batch in the second datasets corresponding to different types of dirt;

a second Riemann center calculation module configured to calculate a second Riemann center of all second feature matrices corresponding to all sample batches in each of the second datasets;

a sample feature matrix extraction module configured to, under a condition that the electromagnetic flowmeter works online, acquire resistance values between the electrode and the ground to form a sample set to be tested, and extract a sample feature matrix of the sample set to be tested;

a similarity index calculation module configured to respectively calculate a similarity index between the sample feature matrix and each of the first feature matrices and the second feature matrices;

a local Riemann center calculation module configured to extract a preset number of feature matrices with a largest similarity index, and calculate a local Riemann center of the preset number of feature matrices;

a proximity calculation module configured to calculate proximity between the local Riemann center and the first Riemann center and proximity between the local Riemann center and the second Riemann center; and a dirt detection result determination module configured to determine a dirt detection result of the electrode corresponding to the sample set to be tested according to a dataset corresponding to a Riemann center with greatest proximity.

7. The system according to claim 6, wherein the first feature matrix extraction module comprises:

a first feature matrix extraction unit configured to extract the first feature matrix corresponding to each sample batch in the first dataset according to $$P_i = \frac{1}{n}\Omega_i\Omega_i^T;$$

wherein $\Omega_i$ denotes an i th sample batch in the first dataset, $\Omega_i=[\sigma_i(1),\sigma_i(2), \ldots ,\sigma_i(n)]\in R^{m\times n}$, and $\sigma_i(n)$ denotes nth resistance value data in $\Omega_i$; n denotes a data sampling size of each sample batch, m denotes a dimensionality of resistance value data, and $R^{m\times n}$ denotes a vector space of m×n ; and $P_i$ denotes a first feature matrix corresponding to the i th sample batch $\Omega_i$ in the first dataset.

8. The system according to claim 7, wherein the first Riemann center calculation module comprises:

a first Riemann center calculation unit configured to calculate the first Riemann center $P_g$ of all first feature matrices corresponding to all sample batches in the first dataset according to $$P_g = \arg\min \sum_{j=1,j\neq i}^{N}\sum_{i=1}^{N} d_R^2(P_i, P_j);$$

wherein $P_j$ denotes a first feature matrix corresponding to a j th sample batch $\Omega_j$ in the first dataset; $d_R(P_i,P_j)$ denotes a Riemann distance between $P_i$ and $P_j$ and N denotes a number of sample batches in the first dataset.

9. The system according to claim 8, wherein the similarity index calculation module comprises:

a similarity index calculation unit configured to respectively calculate the similarity index $S_{oz}$ between the sample feature matrix $Q_c$ and each of the first feature matrices and the second feature matrices according to $$S_{oz} = \sqrt{\sum_{a=1}^{m}\ln^2\lambda_a(Q_c, P_z)^{-1}};$$

wherein $P_z$ denotes a zth feature matrix in a set of the first feature matrices and the second feature matrices; and $\lambda_2(Q_c, P_z)$ denotes a feature value of $Q_c^{-1}P_z$.

10. The system according to claim 9, wherein the proximity calculation module comprises:

a proximity calculation unit configured to respectively calculate proximity α between the local Riemann center $P_{g0}$ and the first Riemann center $P_g$ and proximity α between the local Riemann center $P_{g0}$ and the second Riemann center $P_{gc}$ according to $$\alpha = \frac{P_{g0}}{P_g} \text{ and } \alpha = \frac{P_{g0}}{P_{gc}}.$$

* * * * *